United States Patent
Lee et al.

(10) Patent No.: US 10,156,891 B2
(45) Date of Patent: Dec. 18, 2018

(54) METHOD AND APPARATUS FOR CONTROLLING POWER SUPPLIED TO DISPLAY APPARATUS BASED ON INPUT POWER VOLTAGE

(71) Applicant: SAMSUNG ELECTRONICS CO., LTD., Suwon-si (KR)

(72) Inventors: Sang Hoon Lee, Suwon-si (KR); Jeong Il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/176,261

(22) Filed: Jun. 8, 2016

(65) Prior Publication Data

US 2017/0038823 A1 Feb. 9, 2017

(30) Foreign Application Priority Data

Aug. 5, 2015 (KR) .................. 10-2015-0110576

(51) Int. Cl.
   G06F 1/26      (2006.01)
   G06F 1/32      (2006.01)
   G06F 3/0482    (2013.01)
   G09G 3/20      (2006.01)
   H02J 9/00      (2006.01)
   H02M 1/10      (2006.01)

(52) U.S. Cl.
   CPC .......... *G06F 1/3296* (2013.01); *G06F 1/3218* (2013.01); *G06F 3/0482* (2013.01); *G09G 3/2092* (2013.01); *H02J 9/005* (2013.01); *G09G 2330/022* (2013.01); *G09G 2330/028* (2013.01); *H02M 1/10* (2013.01)

(58) Field of Classification Search
   CPC ............... G06F 1/3218; G06F 1/3296; G09G 2330/022; G09G 2330/028; G09G 3/2092; H02J 9/005; H02M 1/10
   See application file for complete search history.

(56) References Cited

U.S. PATENT DOCUMENTS

| | | | | |
|---|---|---|---|---|
| 4,926,280 A | * | 5/1990 | Richter | .................... H02H 7/16 361/104 |
| 8,450,936 B1 | | 5/2013 | Stopa | |
| 2003/0204761 A1 | * | 10/2003 | D'Alessio | ............. G06F 1/3218 713/320 |
| 2010/0228404 A1 | * | 9/2010 | Link, II | ............... G06F 9/44542 701/1 |
| 2010/0296319 A1 | | 11/2010 | Liu | |
| 2012/0099355 A1 | * | 4/2012 | Xie | ......................... H02H 3/207 363/126 |
| 2013/0119932 A1 | * | 5/2013 | Moon | ................. B60L 11/1816 320/109 |
| 2016/0380531 A1 | * | 12/2016 | Kataoka | .............. H02M 1/4225 323/210 |

* cited by examiner

Primary Examiner — Ram A Mistry
(74) Attorney, Agent, or Firm — Sughrue Mion, PLLC

(57) ABSTRACT

A display apparatus, a power supply and a power control method thereof are provided. The display apparatus includes: a display configured to display an image; a power supply comprising: a voltage supplier configured to receive input voltage and supply operation voltage for the display; and a voltage selector configured to selectively supply the operation voltage according to a level of the input voltage; and a processor configured to output a configuration signal to activate or deactivate the voltage selector.

20 Claims, 8 Drawing Sheets

METHOD AND APPARATUS FOR CONTROLLING POWER SUPPLIED TO DISPLAY APPARATUS BASED ON INPUT POWER VOLTAGE

CROSS-REFERENCE TO RELATED APPLICATION

This application claims priority from Korean Patent Application No. 10-2015-0110576, filed on Aug. 5, 2015 in the Korean Intellectual Property Office, the disclosure of which is incorporated herein by reference in its entirety.

BACKGROUND

Field

Apparatuses and methods consistent with the exemplary embodiments relate to a display apparatus, a power supply and a power control method thereof, more particularly to a display apparatus selectively operating according to an input voltage level of the display apparatus, a power supply and a power control method thereof.

Description of the Related Art

A display apparatus, such as a television (TV), is provided with a power supply for supplying power needed for operations thereof. The display apparatus enter a standby mode in which the power supply is suspended to some components, in order to reduce power consumption, when the display apparatus does not operate for a certain period of time or receives a power off command via a remote control.

When an external input via a user manipulation using a remote control is detected in the standby mode, the display apparatus switches to a normal mode and is supplied with operation voltage for displaying an image in a configuration, for example, a TV image mode.

However, the display apparatus may need to be controlled to stay in the standby mode depending on a usage environment for the display apparatus even though the display apparatus receives an external input. Accordingly, the display apparatus needs a function for selectively supplying operation voltage when an external input is detected in the standby mode.

SUMMARY

According to an aspect of an exemplary embodiment, there is provided a display apparatus including: a display configured to display an image; a power supply including: a voltage supplier configured to receive input voltage and supply operation voltage for the display; and a voltage selector configured to selectively supply the operation voltage according to a level of the input voltage; and a processor configured to output a configuration signal to activate or deactivate the voltage selector.

The voltage selector may include: a comparator configured to receive the input voltage and a reference voltage and to output a comparison result; and a transistor configured to be turned on or off according to the comparison result so that the operation voltage is selectively supplied.

The comparator may output a signal to turn off the transistor to shut off supply of the operation voltage when the input voltage is higher than the reference voltage.

The processor may output a wakeup signal in response to receiving a user input while the display apparatus is in a standby mode, and The power supply may further include a voltage connector configured to receive the wakeup signal output from the processor.

The voltage connector may include a first photo coupler configured to allow the wakeup signal to be applied to a light emitter and allow the voltage supplier to be connected to a light receiver.

The power supply may further include a second photo coupler configured to allow the configuration signal to be applied to a light emitter and allow the voltage selector to be connected to a light receiver.

The display may further display a user interface including a plurality of selectable items corresponding to options of the configuration signal, and The processor may output the configuration signal so that the voltage selector may be activated or deactivated according to an item selected from the plurality of selectable items.

The items may include a single voltage item and a dual voltages item, and the voltage selector may be activated when a configuration signal corresponding to the single voltage item is output from the processor, and the voltage selector is deactivated when a configuration signal corresponding to the dual voltages item is output from the processor.

According to an aspect of another exemplary embodiment, there is provided a power supply including: a voltage supplier configured to receive input voltage and supply the input voltage as operation voltage for a display apparatus; a voltage selector configured to selectively supply the operation voltage according to a level of the input voltage; and an activator configured to activate or deactivate the voltage selector based on a configuration signal received from an outside.

The voltage selector may include: a comparator configured to receive the input voltage and a reference voltage and to output a comparison result; and a transistor configured to be turned on or off according to the comparison result so that the operation voltage is selectively supplied.

The comparator may output a signal to turn off the transistor to shut off supply of the operation voltage when the input voltage is higher than the reference voltage.

A wakeup signal is received in response to receiving a user input while the display apparatus is in a standby mode, and the power supply may further include a voltage connector configured to receive the wakeup signal.

The voltage connector may include a first photo coupler configured to allow the wakeup signal to be applied to a light emitter and allow the voltage supplier to be connected to a light receiver.

The activator may include a second photo coupler configured to allow the configuration signal to be applied to a light emitter and allow the voltage selector to be connected to a light receiver.

The voltage supplier may include: a rectifier configured to rectify input alternating current (AC) power; a power factor corrector configured to correct a power factor of the rectified power; a resonator configured to control resonance of a voltage received from the power factor corrector; a converter configured to transmit the controlled voltage at a first side output from the resonator to a second side; and a smoother configured to smooth the transmitted voltage at the second side of the converter to supply the power as the operation voltage.

According to an aspect of another exemplary embodiment, there is provided a power control method of a display apparatus, and the method may include: detecting a wakeup signal in a standby mode of the display apparatus; determining whether to activate a voltage selector configured to selectively supply operation voltage for the display apparatus to display a image based on a configuration signal which is generated based on a user input; and selectively switching from the standby mode to a normal mode based on a level of an input voltage to the display apparatus in response to the voltage selector being activated.

The method may further include generating the wakeup signal in response to a user input received in the standby mode of the display apparatus.

The method may further include: displaying a user interface including a plurality of selectable items; and selecting an item from among the plurality of selectable items based on the user input, wherein the configuration signal is generated based on the selected item.

The items may include a single voltage item and a dual voltages item, wherein the voltage selector is activated when the single voltage item is selected, and the voltage selector is deactivated when the dual voltages item is selected.

The method may further include: Selectively switching the display apparatus from the standby mode to the normal mode based on a comparison between the input voltage and a predetermined reference voltage.

The selectively switching may include maintaining the standby mode when the input voltage is higher than the predetermined reference voltage.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
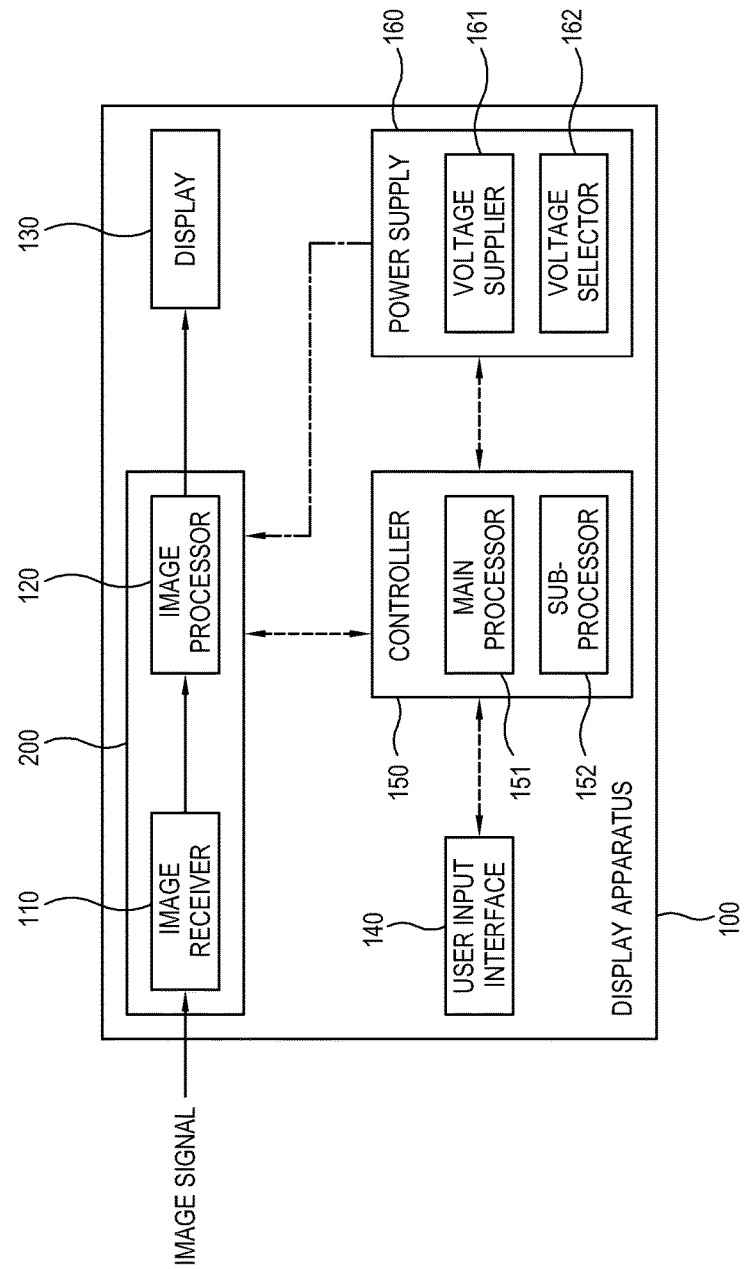
FIG. 1 is a block diagram illustrating a configuration of a display apparatus according to an example embodiment.

Hereinafter, example embodiments will be described in detail with reference to the accompanying drawings so that the inventive concept may be readily implemented by those skilled in the art. However, it is to be noted that the present disclosure is not limited to the illustrative examples but can be realized in various other ways. In the drawings, certain parts not directly relevant to the configuration of the present disclosure are omitted to enhance the clarity of the present disclosure, and like reference numerals denote like parts throughout the whole document. In the embodiments, the term "comprise" or "include" is used to indicate the existence of a feature, number, step, operation, component, or a combination thereof stated in the specification and do not the existence or addition of one or more other features, numbers, steps, operations, components, or combinations thereof.

FIG. 1 is a block diagram illustrating a configuration of a display apparatus 100 according to an example embodiment.

The display apparatus 100 may process an image signal according to a preset process to display an image.

The display apparatus 100 may be a television (TV) that displays a broadcast image based on a broadcast signal/broadcast information/broadcast data received from a transmitter of a broadcasting station. However, the display apparatus 100 is not limited thereto, and may display other kinds of images, without being limited to a broadcast image. For example, the display apparatus 100 may display an image which is based on a signal/data received from various forms of image sources, such as a video, a still image, an application, an on-screen display (OSD), and a user interface (UI), also referred to as a graphic user interface (GUI), for control of various operations.

The display apparatus 100 may be implemented as a broadcast receiving apparatus to process a broadcast signal based on a broadcast signal/broadcast information/broadcast data received via ground waves, a cable, a communications satellite, or the like.

However, the display apparatus 100 may process any kind of image signal, without being limited to a broadcast signal. The display apparatus 100 may receive an image from various forms of external devices, for example, a smartphone, a smart pad including a tablet, a mobile device including an MP3 player, and a personal computer (PC) including a desktop or laptop. Further, the display apparatus 100 may process a signal to display a video, a still image, an application, an OSD, a UI (or a GUI) for control of various operations based on a signal/data stored in an internal or external storage medium.

MA signal source is not limited to a broadcasting station. That is, the signal source may include any device or station capable of transmitting and receiving information.

The display apparatus 100 may be configured as a smart TV or Internet Protocol (IP) TV. A smart TV is a TV that is capable of receiving and displaying a broadcast signal in real time and enabling retrieval and use of various kinds of content via the Internet with a web browsing function thereof simultaneously with displaying a broadcast signal in real time, and provides a convenient user environment for retrieval and use of content. Also, a smart TV may have an open software platform to provide a user with a two-way service. Thus, a smart TV may provide a user with various kinds of content, for example, an application providing a service, through the open software platform. The application may be an application program capable of providing various kinds of services, which includes, for example, applications providing, a social networking service (SNS) and banking, news, weather, map, music, game, and electronic book services.

The inventive concept may also be applied to other types of display apparatuses that are different from the display apparatus 100 according to the present embodiment, for example, a smartphone, a smart pad including a tablet, a mobile device including an MP3 player, and a monitor connected to a main body of a PC including a desktop or laptop. Further, the display apparatus 100 according to the present embodiment may be applied to a large-scale display. For example, a video wall using a plurality of display apparatuses, a digital signage, and a large format display (LFD) may include the display apparatus 100.

That is, it is noted that the embodiment to be described below is merely an example among various modifications according to a system implementation method and does not limit the idea of the inventive concept.

As illustrated in FIG. 1, the display apparatus 100 includes an image receiver 110 to receive an image signal, an image processor 120 to process an image signal received by the image receiver 110, a display 130 to display an image based on an image signal processed by the image processor 120, a user input interface 140 to receive a user input, a controller 150 to control the display apparatus 100, and a power supply 160 to supply power.

The display apparatus 100 may include an image processing apparatus, such as a set-top box (STB). For example, the STB may receive and process a broadcast signal from an image source through a cable and output the broadcast signal to be displayed on the connected display apparatus, in which case the image receiver and the image processor may be disposed in the STB. Further, the STB may receive a user command from the user input interface 140 and perform control to display an image or UI corresponding to the user command on the connected display apparatus.

Hereinafter, the configuration of the display apparatus 100 will be described in detail.

The image receiver 110 may receive an image signal and transmit the image signal to the image processor 120. The image receiver 110 may be implemented differently according to exemplary embodiments based on standards of received image signals and/or configurations of the display apparatus 100. For example, the image receiver 110 may wirelessly receive a radio frequency (RF) signal transmitted from a broadcasting station or receive image signals via a cable in accordance with composite video, component video, super video, SCART, or high definition multimedia interface (HDMI) standards. When the image signal is a broadcast signal, the image receiver 110 may include a tuner to tune the broadcast signal to each channel.

An image signal may be input from an external device. For example, an image signal may be input from an external device, such as a PC, an audio/video (AV) device, a smartphone, and a smart pad. Further, an image signal may arise from data received through a network, such as the Internet. In this case, the display apparatus 100 may further include a cable or wireless network communication unit. An image signal may arise from data stored in a nonvolatile storage, such as a flash memory and a hard disk. The storage may be provided inside or outside the display apparatus 100. When the storage is provided outside, the storage may further include a connector for connecting the storage.

The image processor 120 may perform various kinds of preset image processing on an image signal. The image processor 120 outputs the processed image signal to the display 130 so that an image is displayed on the display 130.

The image processor 120 may perform any kind of image processing, for example, without being limited to, decoding according to various image formats, de-interlacing, frame refresh rate conversion, scaling, noise reduction to improve image quality, detail enhancement, line scanning, or the like. The image processor 120 may be implemented as a group of individual components independently performing the respective processes or as a system on chip (SOC) that integrates multiple functions.

In the present embodiment, the image processor 120 may be provided in an image board 200 in FIG. 2 (hereinafter, also referred to as a TV image board). Here, the image board 200 may further include at least one of the image receiver 110 and the controller 150 to be described below. For example, the image board 200 may be implemented as a printed circuit board (PCB) on which various chipsets, memories, electronic components, and wiring for performing respective processes of the image processor 120 and the controller 150 are mounted.

The display 130 displays an image based on an image signal processed by the image processor 120. The display 130 may be configured, without being particularly limited, in various display modes using liquid crystals, plasma, light emitting diodes, organic light emitting diodes, a surface conduction electron emitter, a carbon nano-tube, nano-crystals, or the like.

The display 130 may further include an additional component depending on a display mode thereof. For example, in a display mode using liquid crystals, the display 130 includes a liquid crystal display (LCD) panel, a backlight unit to provide light to the panel, and a panel driving board to drive the panel.

The display 130 may display various UIs including menu items of the display apparatus 100.

The user input interface 140 may transmit various preset control commands or unrestricted information to the controller 150 based on a user's manipulations or inputs.

The user input interface 140 may include a key pad (or input panel) including keys, e.g., a power key, a number key, and a menu key, provided on a main body of the display apparatus 100. The user input interface 140 may further include an input device separate from the main body, such as a remote control, a keyboard, and a mouse, provided to generate and transmit a command/data/information/signal to the display apparatus 100.

The remote control may include a button input portion including a power key, a direction key, a number key, and a menu key. Further, the remote control may further include a touch detector to receive a user touch input and/or a motion detector to detect a motion by a user.

The user input interface 140 may further include at least one of an image sensor included in a camera provided in front of the main body to detect a user gesture input and an audio receiver, that is, a microphone, to receive a sound uttered by a user. The audio receiver may be provided on the main body of the display apparatus 100 or the input device, such as a remote control.

The input device is an external device capable of performing wireless communication with the main body of the display apparatus 100, and wireless communication includes Bluetooth communication, infrared communication, RF communication, communication via a wireless local area network (WLAN), and Wi-Fi Direct communication. The input device transmits a preset command to the display apparatus 100 by being manipulated by a user.

The key pad includes a physical keypad formed on a front side and/or lateral side of the display apparatus 100, a virtual key pad displayed on the display 130, and a physical keypad connectable via a cable or wirelessly. It would be readily understood by those skilled in the art that the physical keypad formed on the front side and/or lateral side of the display apparatus 100 may be omitted depending on performance or a structure of the display apparatus 100.

The controller 150 performs control operations for various components of the display apparatus 100. For example, the controller 150 may control the image processor 120 to perform image processing and performs a control operation corresponding to a command from the user input interface 140, thereby controlling overall operations of the display apparatus 100.

The controller 150 includes at least one processor. For example, the controller 150 may include a main processor 151 and a sub-processor 152. The at least one processor loads a corresponding program from a nonvolatile memory (ROM) where the program is stored onto a volatile memory (RAM) to execute the program.

The controller 150 may include at least one general-purpose processor, such as a central processing unit (CPU), an application processor (AP), and a microcomputer (micom), which may be configured to load a program corresponding to an algorithm stored in an ROM onto an RAM to execute the program, thereby performing various operations of the display apparatus 100.

When the controller 150 of the display apparatus 100 is implemented as a single processor, for example, a CPU, the CPU may be provided to perform various functions implementable in the display apparatus 100, for example, control of various kinds of image processing on an image displayed on the display including demodulating, decoding, and scaling, an action with respect to a command received through the user input interface 140 including the remote control, control of communication with an external device via a cable or wireless network, voice recognition, and video telephony using a camera and a microphone.

The processor may include a single core, a dual core, a triple core, a quad core, and/or a multiple core. The processor may include a plurality of processors, for example, a main processor 151 and a sub-processor 152 as illustrated in FIG. 1. The sub-processor 152 is provided to operate in a standby mode (hereinafter, also referred to as a sleep mode) in which the display apparatus is supplied with only standby power and does not operate.

The controller 150 of the display apparatus 100 may include a sub-microcomputer (sub-micom) as the sub-processor 152 that outputs a wakeup signal (PS_ON) to the power supply 160 in response to a manipulation on the user input interface 140 being detected in the standby mode. The sub-processor 152 may further output a configuration signal (VS_ON) corresponding to activation or deactivation of a voltage selector 162, which will be described below.

The processors 151 and 152, the ROM, and the RAM included in the controller 150 may be connected with each other.

When the display apparatus 100 is implemented as a monitor, the controller 150 may further include a graphic processing unit (GPU) provided for graphic processing in a main body of a PC. When the broadcast receiving apparatus 100 is implemented as a digital TV, a smartphone, or a smart pad, a processor may include a GPU, and the processor may be implemented as a SOC with a core and a GPU combined.

The controller 150 may include a program for performing a specific function supported in the display apparatus 100, for example, a function of detecting an error in a configuration including the main processor, and a chip, for example, an integrated chip (IC), as a dedicated processor that executes the program.

The power supply 160 supplies power to the components 110 to 150 of the broadcast receiving apparatus 100 according to control by the controller 150. The power supply 160 converts applied external alternating current (AC) power (input power) into direct current (DC) power and regulates the converted DC power to a level to provide the power to the components 110 to 150 in the broadcast receiving apparatus 100. FIG. 1 illustrates that the power supply 160 supplies power to the image board 200. As shown in FIG. 1, the image board 200 may include the image receiver 110 and the image processor 120, without being limited thereto. According to an exemplary embodiment, the power supply 160 may be configured to supply operation voltage to at least part of other components of the display apparatus 100.

The power supply 160 may be implemented as, for example, a switched-mode power supply (SMPS). The power supply 160 may further include a power converter including a transformer circuit that decompresses DC power to a level to be converted into voltages corresponding to rated voltages of the respective components 110 to 150 in the broadcast receiving apparatus 100. In this specification, the power supply 160 is also referred to as a power supply device or a power unit.

Figure 2:
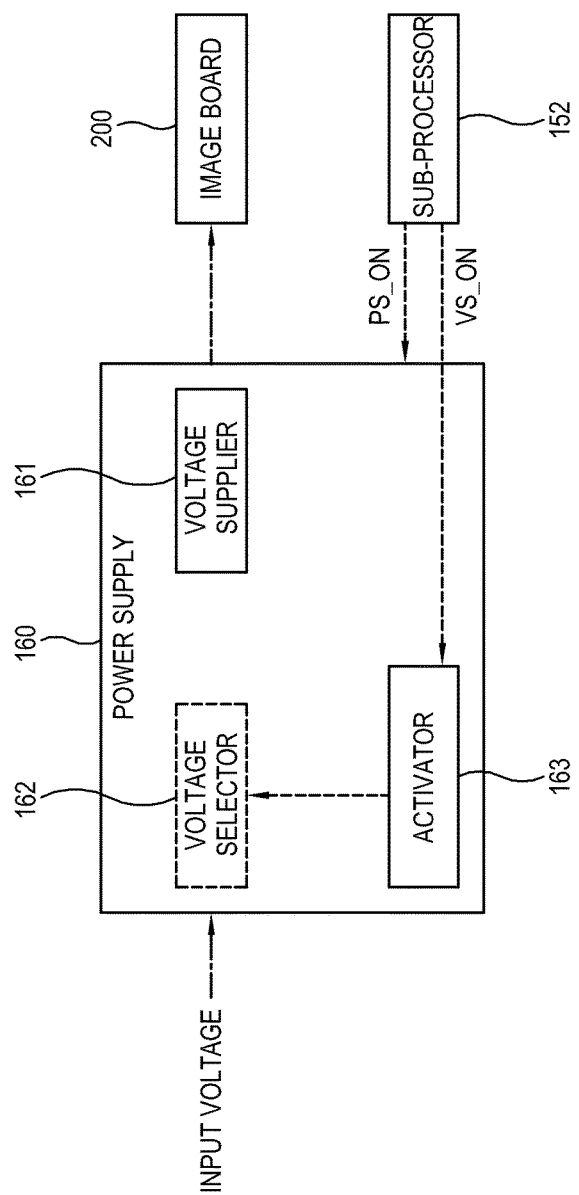
FIG. 2 is a block diagram illustrating a configuration of a power supply according to an example embodiment.

FIG. 2 is a block diagram illustrating a configuration of the power supply 160 according to an example embodiment.

As illustrated in FIG. 2, the power supply 160 includes a voltage supplier 161 to supply operation voltage, a voltage selector 162 to selectively supply operation voltage according to an input voltage level, and an activator 163 to activate or deactivate the voltage selector 162 based on a configuration signal.

The voltage supplier 161 supplies operation voltage to components of the display 130 for displaying an image on the display 130. For example, the voltage supplier 161 may supply operation voltage to the image board 200 including at least part of the image receiver 110, the image processor 120, and the controller 150.

The display apparatus 100 may have a plurality of power modes including a standby mode in which power supply to some components is suspended according to a condition of the components. For example, the display apparatus 100 may enter the standby mode when the system including the image board 200 does not operate over a preset period of time or a power off command is received via the remote control.

When the display apparatus 100 is in the standby mode, the power supply 160 may supply power to the sub-processor 152. In the standby mode, power may be supplied to the user input interface 140 to receive a user command including the remote control, a communication unit to communicate with an external input device, such as the remote control, and a connector to detect an external input, such as a USB.

When the sub-processor 152 detects an external input, for example, a remote control input, the display apparatus 100 may come out of the standby mode and switch to a normal mode.

Figure 3:
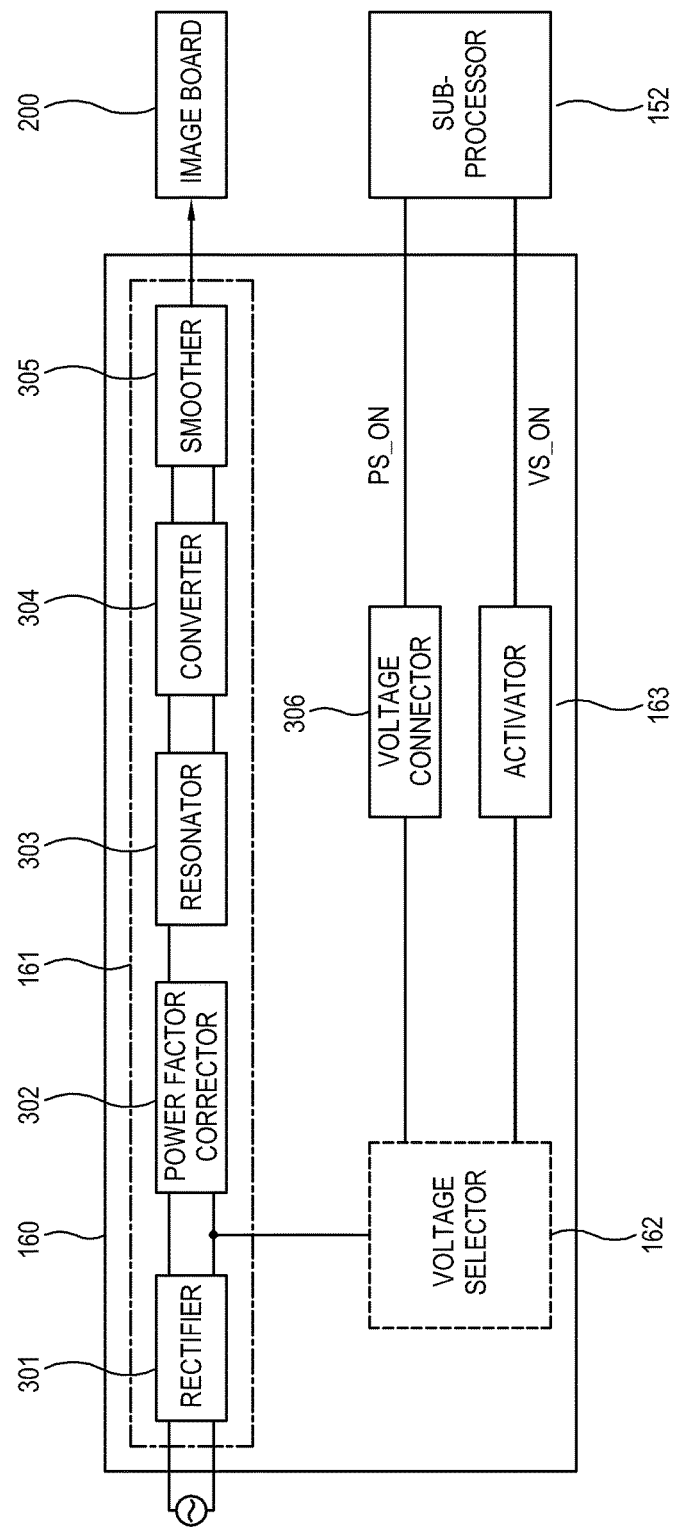
FIG. 3 is a block diagram illustrating the configuration of a power supply according to another example embodiment.
Figure 4:
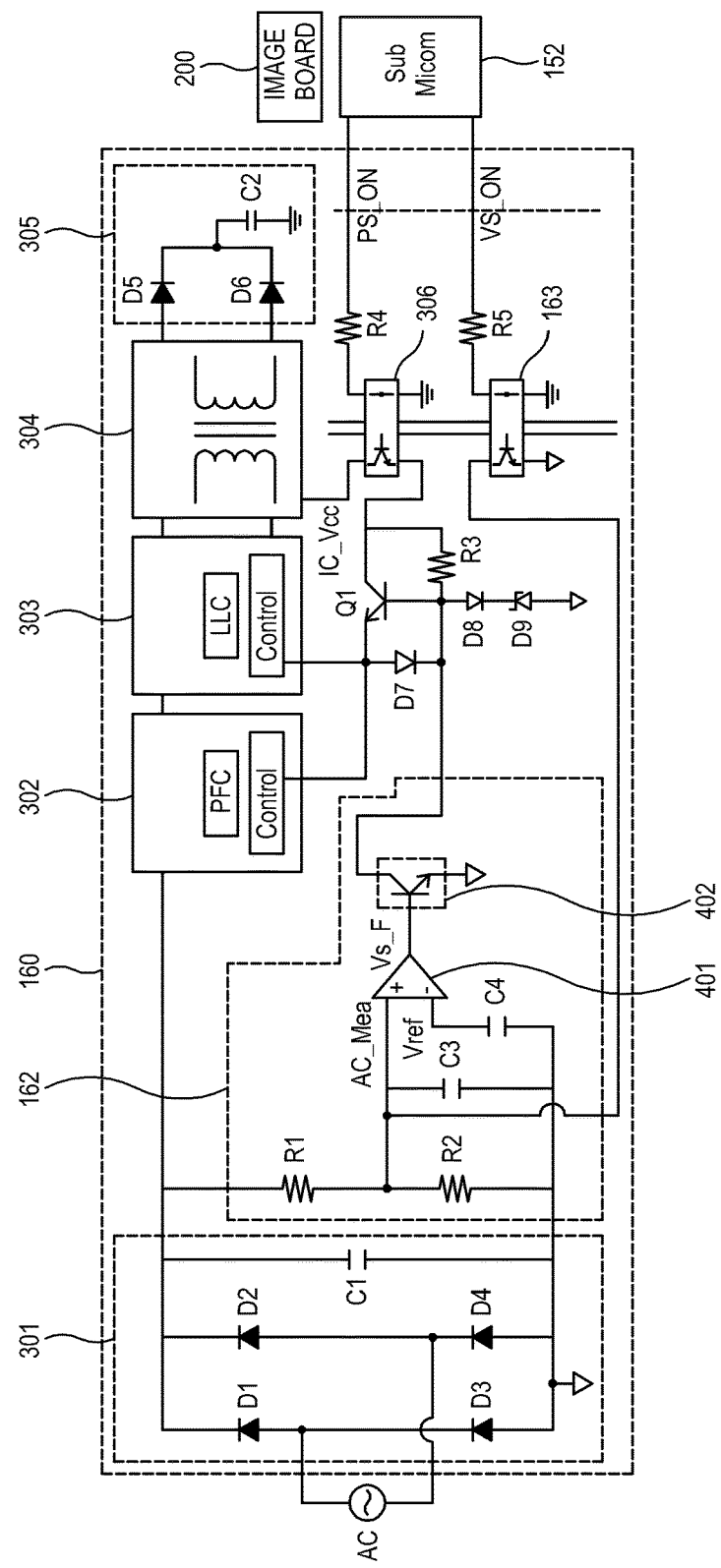
FIG. 4 is a circuit diagram illustrating a power supply according to an example embodiment.

FIG. 3 is a block diagram illustrating the configuration of the power supply 160 in more detail according to an example embodiment, and FIG. 4 is a circuit diagram illustrating an example of the power supply 160 of FIG. 3.

As illustrated in FIGS. 3 and 4, the power supply 160 may further include a rectifier 301 to rectify input AC power, a power factor corrector 302 to correct a power factor of rectified power, a resonator 303 to resonate a voltage received from the power factor corrector 302 to output the voltage, a converter 304 to transmit the voltage at a first side output from the resonator 303 to a second side, a smoother 305 to smooth a voltage at the second side of the converter 304 to supply the power to the image board 200 as output voltage from the power supply 160, and a voltage connector 306 to connect the voltage supplier 161 to be operable.

The rectifier 301 may include a plurality of rectifier diodes D1, D2, D3, and D4 and a capacitor C1 as in FIG. 4 and rectifies input AC power to be converted into DC power. The rectifier 301 is not limited to a structure illustrated in FIG. 4, and may be implemented in different forms.

The power factor corrector 302 is provided to correct a power factor so that the power supply 160 outputs power with a current value uniformly corrected overall to improve power quality. The power factor corrector 302 may include, for example, a power factor correction (PFC) IC with a control terminal configured in a digital mode as illustrated in FIG. 4.

The PFC IC illustrated in FIG. 4 is an example of the power factor corrector 302 according to an exemplary embodiment, and is not limited thereto. For example, the power factor corrector 302 may be implemented in a combination of a switching element and an inductor and change a duty cycle according to a voltage to improve a power factor.

The resonator 303 may operate by a resonant frequency determined by resonance between L and C, and transmit part of a resonant current, which is generated by resonating square waves received from the power factor corrector 302, to the first side of the converter 304.

The resonator 303 may be implemented as, for example, as illustrated in FIG. 4, an LLC resonant controller IC with a control terminal operating in a digital mode. However, the resonator 303 is not limited thereto and may be implemented as, for example, an LC resonant converter.

The resonator 303 may serve to maintain a uniform voltage gain despite a change in a load of an output terminal of the power supply 160 and to control an output voltage with an almost constant frequency regardless of a load change.

The converter 304 may be implemented, for example, as a transformer having first and second coils as in FIG. 4, and transmit power output from the resonator 303 to the smoother 305.

The smoother 305 may rectify AC voltage applied from the second side of the converter 304 into DC voltage and supply power to the image board 200 as operation voltage. The image board 200 may be supplied with an operation voltage of, for example, 13 V. The smoother 305 may include a plurality of rectifier diodes D5 and D6 and a smoothing capacitor C2.

The power supply 160 may further include diodes D7, D8, and D9, a transistor Q1, and resistors R4 and R5 as shown in FIG. 4.

The power supply 160 may receive input voltage and stably supply operation voltage to a system performing an operation, such as the image board 200. The configuration of the power supply 160 illustrated in FIGS. 3 and 4 may be used for an SMPS, and it would be readily understood by those skilled in the art that some components may be added or excluded depending on performance or a structure of the display apparatus 100.

As illustrated in FIG. 4, the voltage selector 162 may include a comparator 401 to receive input voltage AC_Mea and a reference voltage Vref and output a comparison result VS_F. The transistor 402 may be turned on or off according to an output VS_F from the comparator 401, and selectively supply operation voltage provided from the voltage supplier 161.

The voltage selector 162 may be provided as an option circuit for single power supply and include an input voltage (AC voltage) measurement circuit and a reference voltage generation circuit. The voltage selector 162 may function to prevent generation of a secondary output voltage from the voltage supplier 161 when a measured input voltage is greater than a reference voltage.

An input voltage may be, for example, an AC voltage of 110 V or 220 V, and the voltage level of the input voltage may be changed by the rectifier 301 and applied to the comparator 401. The reference voltage Vref is determined to be output as a high or low voltage according to a result of comparison with an input voltage level and may be, for example, 2.5 V.

For example, the comparator 401 may output a high signal when an input voltage of 110 V is input to the power supply 160, while the comparator 401 may output a low signal when an input voltage of 120 V is input.

The transistor 402 may be configured as a switching element that is turned on when a high signal is applied from the comparator 401, and is turned off when a low signal is applied.

Accordingly, when the voltage selector 162 is activated and an AC voltage of 110 V is applied to the power supply 160, power is properly supplied to components of the voltage supplier 161, and accordingly operation voltage is also supplied to the image board 200.

However, when the voltage selector 162 is activated and an AC voltage of 220 V is applied to the power supply 160, the voltage selector 162 shuts off power supply to the components of the voltage supplier 161, and accordingly operation voltage is not supplied to the image board 200.

The voltage connector 306 is connected such that the voltage supplier 162 may operate when a wakeup signal PS_ON is applied from the sub-processor 152 in the standby mode of the display apparatus 100, that is, when a wakeup signal is high. The wakeup signal may be applied by a user manipulation, such as an input via the remote control, while the display apparatus 100 is in the standby mode.

That is, the sub-processor (sub micom) 152 may detect a user input received in the standby mode and apply a wakeup signal PS_ON to the voltage connector 306 in response to the detected user input via the remote control. When the wakeup signal PS_ON is high, the voltage connector 306 allows the voltage supplier 161 to form a connected circuit.

As illustrated in FIG. 4, the voltage connector 306 may include a photo coupler (hereinafter, also referred to as a first photo coupler) which allows a wakeup signal PS_ON to be applied to a light emitter and allows the voltage supplier 161 to be connected to a light receiver. When the wakeup signal PS_ON is high, the light emitter emits light, the light receiver receives the light from the light emitter PC1, and thus the voltage connector 306 is connected.

Although the first photo coupler is described as being in an active high mode in which the first photo coupler operates in response to a high signal, the voltage connector 306 may include a photo coupler in an active low mode that operates in response to a low signal.

Further, although FIG. 4 illustrates that the voltage connector 306 is implemented as a photo coupler, the voltage connector 306 may be implemented as various elements capable of selectively connecting and disconnecting a circuit. For example, the voltage connector 306 may be a switching element, such as a transistor, which maintains an off state in the standby mode and is turned on in response to a wakeup signal PS_ON applied from the sub-processor 152.

The activator 163 may receive a configuration signal VS_ON corresponding to activation or deactivation of the voltage selector 162 from the sub-processor 152. The activator 163 activates or deactivates the voltage selector 162 based on the received configuration signal VS_ON.

As illustrated in FIG. 4, the activator 163 may include a photo coupler (hereinafter, also referred to as a second photo coupler) which allows a configuration signal VS_ON to be applied to a light emitter and allows the voltage selector 162 to be connected to a light receiver.

When the configuration signal VS_ON output from the sub-processor 152 is low, the light emitter receiving the low signal emits light, the light receiver receives the light from the light emitter, and thus activator 163 is connected. When the activator 163 is connected, the voltage selector 162 may be activated. Then, the voltage selector 162 may allow operation voltage to be selectively supplied to the image board 200 according to an input voltage level.

However, when the configuration signal VS_ON output from the sub-processor 152 is high, the activator 163 may maintain a disconnected state, and thus the voltage selector 162 may be deactivated. Then, operation voltage is supplied to the image board 200 regardless of a level of input voltage of the power supply 160.

Although the second photo coupler is described as being in an active low mode in which the second photo coupler operates in response to a low signal, the activator 163 according to an exemplary embodiment may be configured to include a photo coupler in an active high mode in which the second photo coupler operates in response to a high signal.

Further, although FIG. 4 illustrates that the activator 163 is implemented as a photo coupler, the activator 163 may be implemented as various elements capable of selectively connecting and disconnecting a circuit. For example, the activator 163 may be a switching element, such as a transistor, which is turned on in response to a configuration signal VS_ON applied from the sub-processor 152.

The configuration signal VS_ON may be output to the activator 163 according to a preset option corresponding to a user selection.

Figure 5:
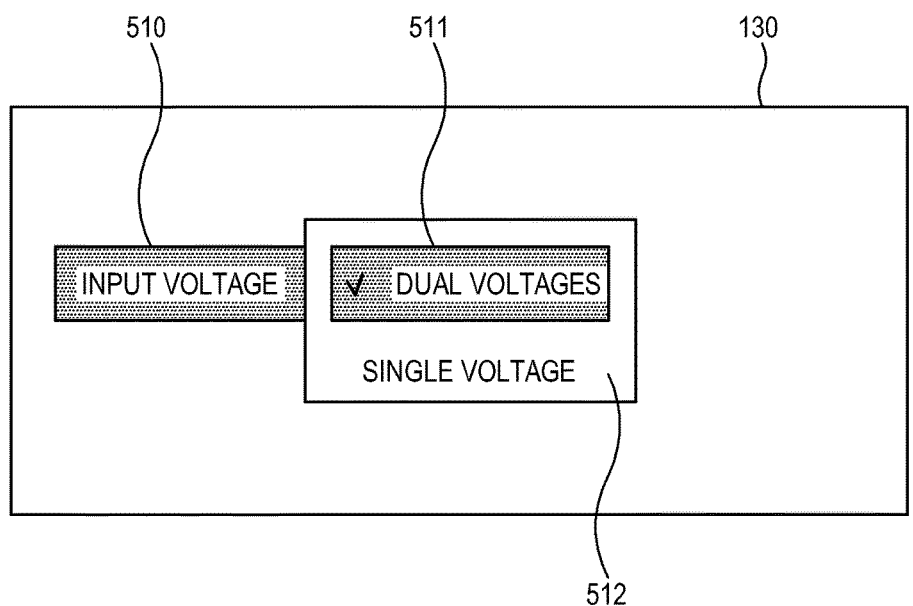
FIG. 5 illustrates a screen for configuring a user option according to a configuration signal according to an example embodiment.

FIG. 5 illustrates a screen for configuring a user option according to a configuration signal according to an exemplary embodiment.

As illustrated in FIG. 5, the display 130 may display a UI for selecting an option for a configuration signal and the UI may include a plurality of selectable items. Here, the items may be displayed according to selection of an input voltage menu 510 and include a dual voltages item 511 and a single voltage item 512.

The sub-processor 152, that is, the sub-micom, may store a program for selecting dual voltages or single voltage and outputting a configuration signal corresponding to a selection.

A user may sequentially select a TV service menu and a subordinate menu that is the input voltage menu 510, and select any one of the dual voltages item 511 and the single voltage item 512 according to a usage environment for the display apparatus 100

For example, the dual item 511 may be selected when the display apparatus 100 is sold in South Korea, Europe, and the like which provide 220 V, while the single item 512 may be selected when the display apparatus 100 is sold in the USA, Japan, and the like which provide 110 V.

When the dual voltages item 511 is selected in FIG. 5, the sub-processor 152 outputs a high signal as a configuration signal VS_ON to the activator 163. Then, the voltage selector 162 is deactivated.

When the single voltage item 512 is selected in FIG. 5, the sub-processor 152 outputs a low signal as a configuration signal VS_ON to the activator 163. Then, the voltage selector 162 is activated.

Any one may be selected from dual voltages item 511 and single voltage item 512 according to a sales destination in process of manufacturing (or producing) a product, that is, the display apparatus 100.

Figure 6:
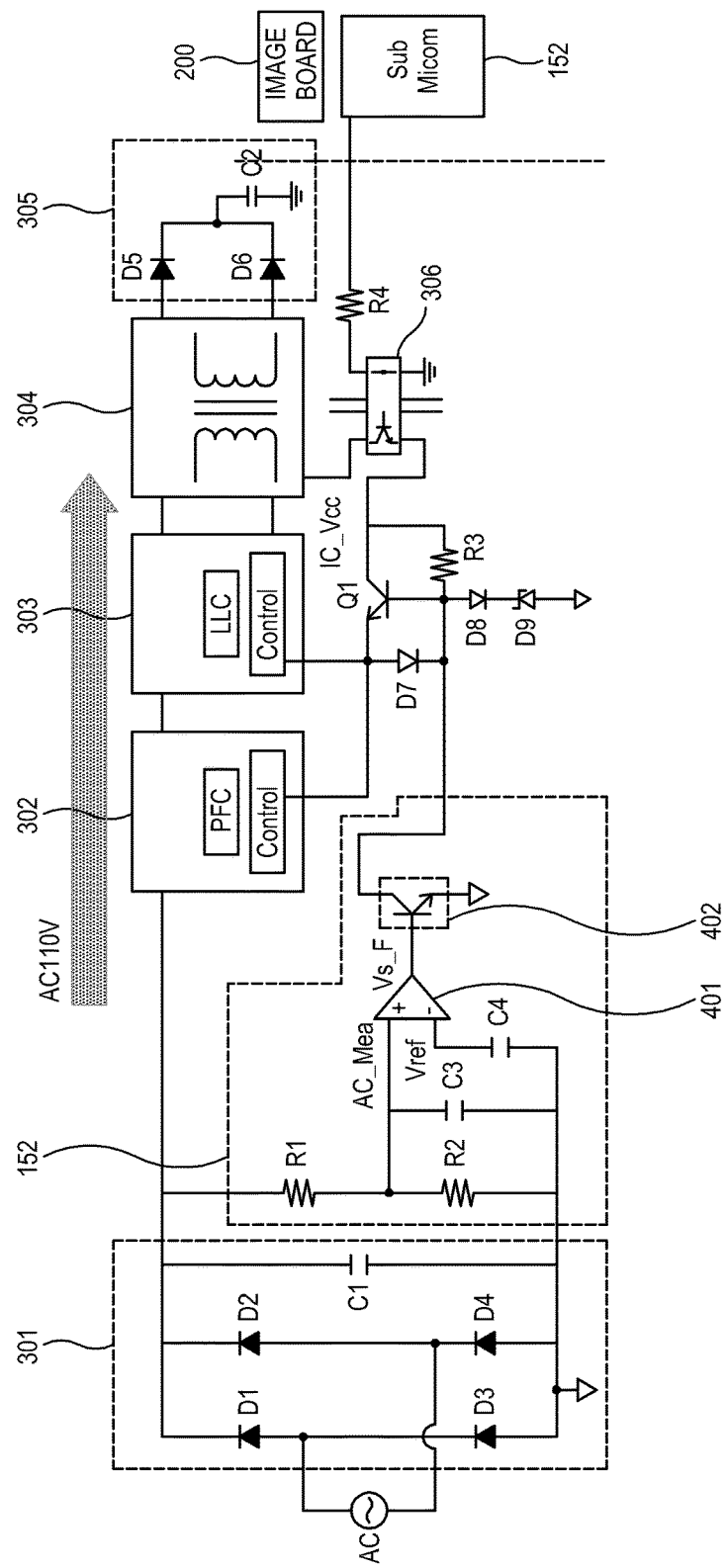
FIGS. 6 and 7 are circuit diagrams illustrating operations of a power supply according to an example embodiment.
Figure 7:
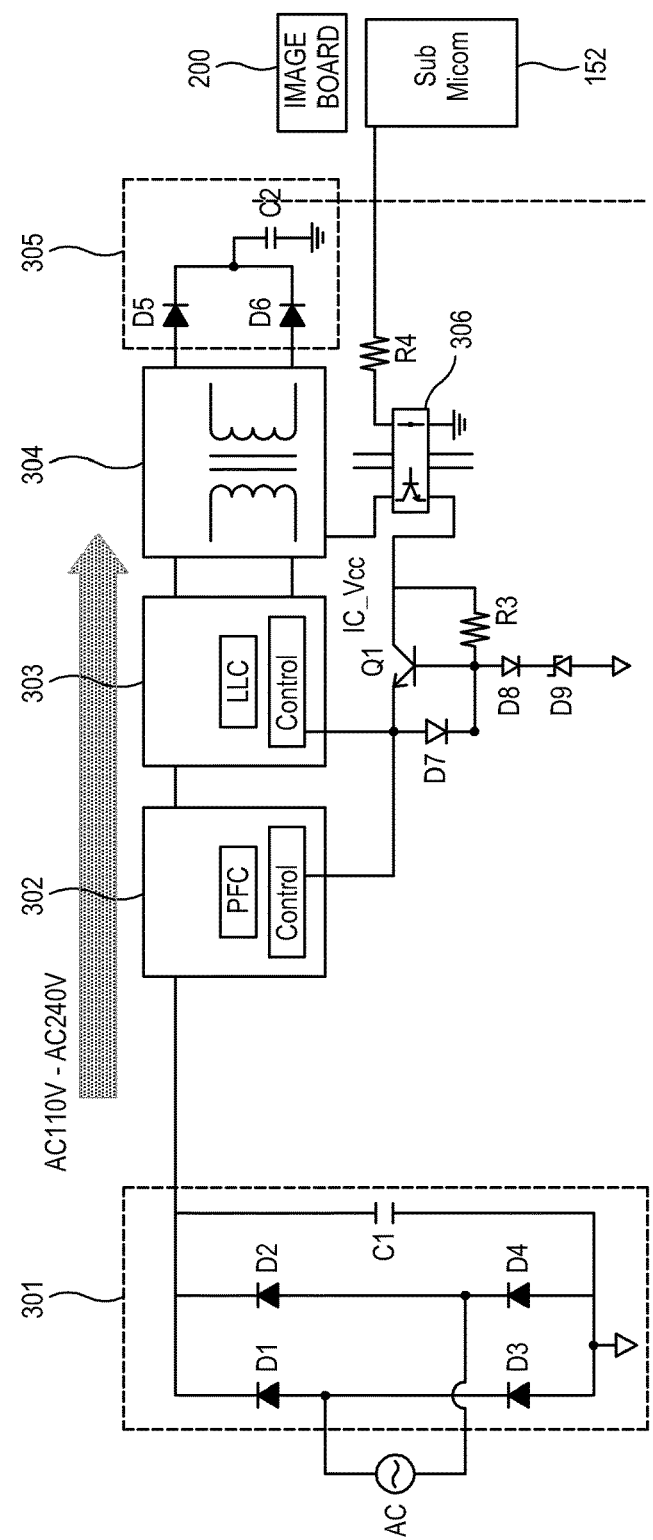

FIGS. 6 and 7 are circuit diagrams illustrating operations of the power supply 160 in cases where the voltage selector 162 is activated and deactivated according to an example embodiment.

When the single voltage item 512 is selected and accordingly the sub-processor 152 outputs a low signal as a configuration signal VS_ON to the activator 163, the voltage selector 162 is activated.

The activated voltage selector 162 compares an input voltage with a reference voltage, and does not allow generation of a secondary output voltage when the input voltage is higher than the reference voltage.

For example, in a case where an AC voltage of 110 V is input, when a wakeup signal PS_ON input via the remote control is high, the voltage selector 162 normally generates a secondary output voltage. The voltage supplier 161 supplies operation voltage to the image board 200 via rectification, resonation, conversion, and smoothing processes. Accordingly, the display apparatus 100 switches from the standby mode to the normal mode and normally displays an image.

However, in a case where an AC voltage of 220 V is input, when a wakeup signal PS_ON input via the remote control is high, the voltage selector 162 does not generate a secondary output voltage. Accordingly, operation voltage is not applied to the image board 200, and the display apparatus 100 maintains the standby mode.

Accordingly, a single-voltage product normally operating with an input voltage as illustrated in FIG. 6 may not be allowed to be used in an AC 220 V environment.

When the dual voltages item 511 is selected and accordingly the sub-processor 152 outputs a high signal as a configuration signal VS_ON to the activator 163, the voltage selector 162 is deactivated.

As the voltage selector 162 is deactivated, the power supply 160 operating with dual voltages operates like a circuit having no voltage selector 162 as in FIG. 7.

Specifically, when a wakeup signal PS_ON input via the remote control is high in a whole range from an input voltage of AC 100 V to AC 240 V, the voltage supplier 161 supplies operation voltage to the image board 200 via rectification, resonation, conversion, and smoothing processes. Accordingly, the display apparatus 100 switches from the standby mode to the normal mode and normally displays an image.

Accordingly, a dual-voltages product on sale is available in the whole range from an input voltage of AC 100 V to AC 240 V as in FIG. 7.

As described above, the power supply 160 according to an exemplary embodiment may include the activator 153 to activate or deactivate the voltage selector based on a configuration signal applied from an outside, such as the sub-processor 162, thereby operating as one of a single-voltage power supply or a dual-voltages power supply.

The display apparatus 100 may have different input voltage levels depending on a sales destination. Accordingly, it is necessary to design the power supply for a single-voltage power circuit and a dual-voltages power circuit.

Accordingly, in designing a PCB circuit, there may be used a manufacture method in which components of the voltage supplier 161 are commonly installed and components of the voltage selector 162 are additionally installed if a single-power power circuit is necessary depending on a destination.

In this case, however, while a PCB is commonly applied, it is needed to separately manage manufacture lines of a power supply (SMPS) assembly for a single-voltage circuit and a dual-voltages circuit and double kinds of power supply devices are produced, thus reducing management efficiency in manufacture and production.

In designing a PCB circuit of the power supply device, that is, the power supply 160, according to the present embodiment, even components of the voltage selector 162 are basically installed and the activator 163 to activate or deactivate the voltage selector 162 is further installed.

Thus, one assembly line may be used for both a PCB and an SMPS, thereby manufacturing and producing two kinds of power specifications of a dual-voltages power supply and a single-voltage power supply using a unitary production line without an increase in SMPS kind.

In addition, the power supply 160 enables activation or deactivation of a power selection function (single-power function) only with simple signal processing based on an option selected by a user without addition of a hardware configuration, thus improving efficiency in manufacture and production.

Hereinafter, a power control process of the display apparatus 100 according to an exemplary embodiment will be described.

Figure 8:
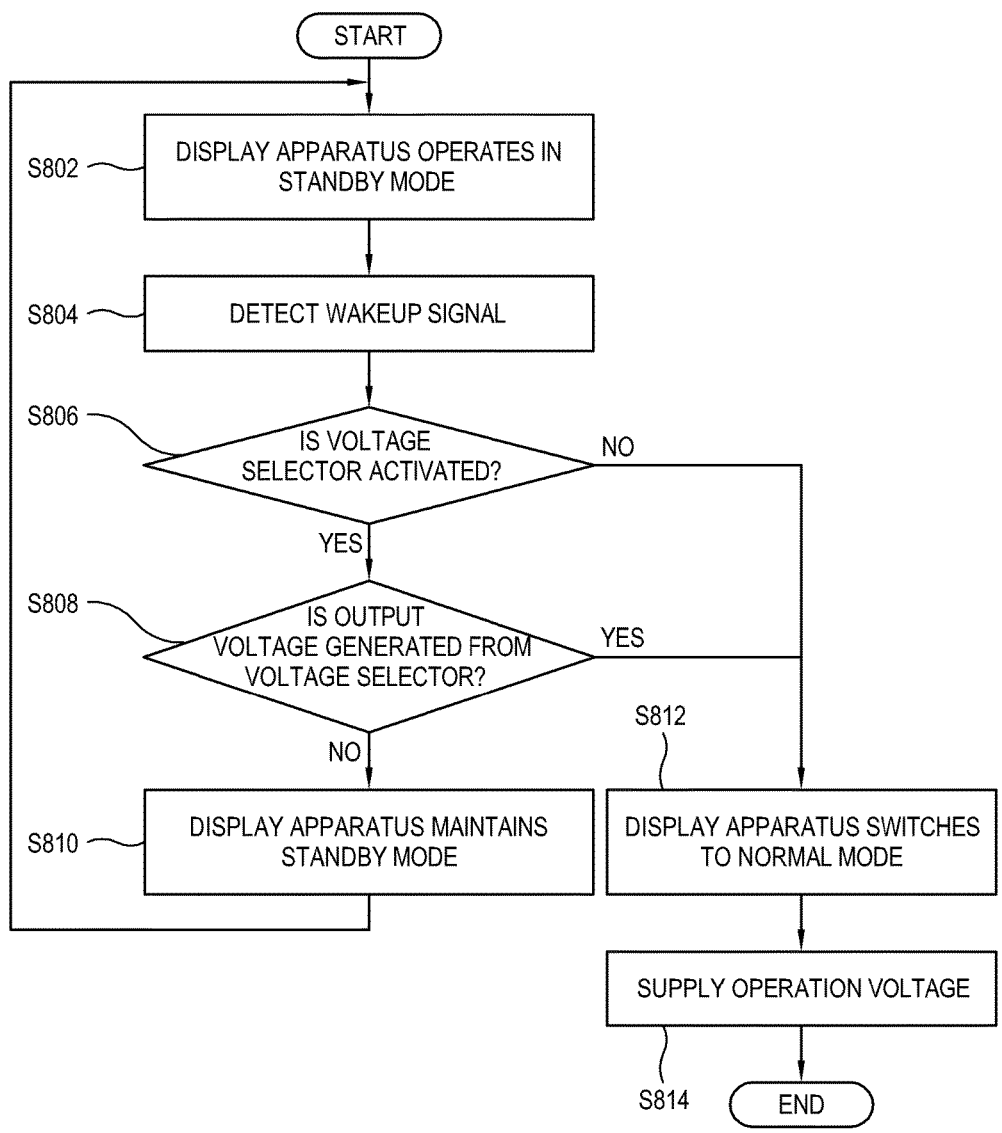
FIG. 8 is a flowchart illustrating a power control method of a display apparatus according to an example embodiment.

FIG. 8 is a flowchart illustrating a power control method of the display apparatus 100 according to an exemplary embodiment.

As illustrated in FIG. 8, the display apparatus 100 may operate in the standby mode in which power is supplied to only some components in order to reduce power consumption (S802). Here, the display apparatus 100 may enter the standby mode from the normal mode when the display apparatus 100 does not operate over a period of time or receives a power off command through the user input interface 140, such as the remote control. In an exemplary embodiment, in the standby mode, power supply to the main processor 151 may be shut off and power may be supplied to the sub-processor 152.

While the display apparatus 100 is operating in the standby mode in S802, it may be detected that a wakeup signal PS_ON is input by the sub-processor 152 (S804). Here, the wakeup signal may be generated according to a user input via the user input interface 140 including the remote control. A signal which is output from the sub-processor 152 in response to the user input may be changed into a high signal to be input as the wakeup signal.

When the wakeup signal is input in S804, the voltage connector 306 operates to transmit the signal and it is determined based on a configuration signal VS_ON output by the sub-processor 152 whether the voltage selector 162 is activated (S806). Here, when the single-voltage item 512 is selected on the input voltage menu 510 in process of manufacture of the display apparatus 100, it is determined that a low signal is input as the configuration signal VS_ON from the sub-processor 152 and thus the voltage selector 162 is activated. However, when the dual-voltages item 511 is selected on the input voltage menu 510, it is determined that a high signal is input as the configuration signal VS_ON from the sub-processor 152 and thus the voltage selector 162 is deactivated.

When it is determined that the voltage selector 162 is activated in S806, an output voltage (secondary output voltage) from the voltage selector 162 is selectively generated according to an input voltage level (S808). That is, as the voltage selector 163 is activated, the power supply 160 operates as a single-voltage circuit, and when input voltage is 110 V, an output voltage from the voltage selector 162 is generated. Thus, when the input voltage is 220 V, no output voltage is generated from the voltage selector 162.

When no output voltage is generated from the voltage selector 162 in S808, that is, when an input voltage is 220 V, the display apparatus 100 maintains the standby mode even though the wakeup signal is detected (S810). Accordingly, a single-voltage power supply produced for 110 V use maintains the standby mode in a 220 V environment even though a user input is received. As a result, the power supply is unable to perform a normal operation including displaying an image.

On the other hand, when an output voltage is generated from the voltage selector 162 in S808, that is, when an input voltage is 110 V, the display apparatus 100 switches from the standby mode to the normal mode (S812), which corresponds to a case where a single-voltage power supply produced for 110 V use is normally used in a 110 V environment.

Subsequently, operation voltage for displaying an image on the display 130 is properly supplied to the image board 200 (S814). Accordingly, a user is able to watch a broadcast using the display apparatus 100.

When it is determined that the voltage selector 162 is deactivated in S806, the display apparatus 100 switches from the standby mode to the normal mode regardless of a level of an input voltage (S812), which corresponds to a case where a dual-voltages power supply available in a whole range of input voltage is used.

Subsequently, operation voltage for displaying an image on the display 130 is properly supplied to the image board 200 (S814).

According to an exemplary embodiment, as a power supply which is operable as both a single-voltage power circuit and a dual-voltages power circuit is provided, it is possible to produce a product using a single PCB regardless of a sales destination, and thus streamlined production lines may improve efficiency in manufacture and production.

Further, the voltage selector 162 may be selectively activated in a simple way of outputting configuration signal VS_ON corresponding to high or low signal from the processor 152 to the activator 163 in the power supply 160, so that the power supply 160 may be selectively operated as a single-voltage power supply or dual-voltages power supply.

In addition, the UIs 510, 511, and 512 may be provided for a user to select a single-voltage option or a dual-voltages option through the display 130, allowing a user to conveniently make a selection.

Moreover, the power supply configured as a single-voltage power supply may be controlled to selectively supply operation voltage according to a power level, thereby properly preventing use of a product purchased via an illegal channel that does not satisfy a product usage environment on release.

The above-described exemplary embodiments may be implemented in a computer-readable recording medium. The computer-readable recording medium includes a transmission medium and a storage medium that stores data readable by a computer system. The transmission medium can be implemented through wire-based or wireless networks mutually combined with a computer system.

The exemplary embodiments may be implemented by hardware or a combination of hardware and software. As hardware, the controller 150 may include a nonvolatile memory which stores a computer program as software, an RAM to which the computer program stored in the nonvolatile memory is loaded, and at least one processor 151 or 152, for example, a CPU which executes the computer program loaded to the RAM. The nonvolatile memory includes hard disk drives, flash memories, ROMs, CD-ROMs, magnetic tapes, floppy discs, optical storages, data transmission devices using the Internet, or the like, without being limited thereto. The nonvolatile memory is an example of a computer-readable recording medium which records a computer-readable program.

The computer program may be a code readable and executable by the processors 151 and 152, which includes a code enabling the processors 151 and 152 to perform operations, including operations S802 to S814 illustrated in FIG. 8.

The computer program may be included in software including an operating system or an application provided in the display apparatus 100 and/or software interfacing with an external device.

Although exemplary embodiments have been shown and described, it will be appreciated that changes may be made in these exemplary embodiments without departing from the scope the appended claims.

What is claimed is:

1. A display apparatus comprising:
   a display configured to display an image;
   a power supply configured to receive input voltage and supply operation voltage for the display; and
   a processor configured to output a configuration signal to set a permitted range of the input voltage based on a user's selection,
   wherein the power supply comprises:
   a voltage selector configured to selectively prevent generation of the operation voltage from the power supply according to a level of the input voltage when activated, and
   an activator configured to:
      deactivate the voltage selector in response to the configuration signal having a first level such that the power supply supplies the operation voltage regardless of the level of the input voltage, and
      activate the voltage selector in response to the configuration signal having a second level such that the power supply supplies the operation voltage if the level of the input voltage is within the permitted range and the power supply does not supply the operation voltage if the level of the input voltage is beyond the permitted range.

2. The display apparatus of claim 1, wherein the voltage selector comprises:
   a comparator configured to receive the input voltage and a reference voltage and to output a comparison result; and
   a transistor configured to be turned on or off according to the comparison result output from the comparator to selectively prevent generation of the operation voltage.

3. The display apparatus of claim 2, wherein the comparator is further configured to output a signal to turn off the transistor to shut off supply of the operation voltage when the level of the input voltage is higher than a level of the reference voltage.

4. The display apparatus of claim 1, wherein the processor is further configured to output a wakeup signal in response to receiving a user input while the display apparatus is in a standby mode, and
   wherein the power supply further comprises a voltage connector configured to receive the wakeup signal output from the processor.

5. The display apparatus of claim 4, wherein the voltage connector comprises a first photo coupler configured to apply the wakeup signal to a light emitter and connect the power supply to a light receiver.

6. The display apparatus of claim 1, wherein the activator comprises a second photo coupler configured to apply the configuration signal to a light emitter and connect the voltage selector to a light receiver.

7. The display apparatus of claim 1, wherein the display is further configured to display a user interface comprising a plurality of selectable items corresponding to options of the permitted range of the input voltage, and
   wherein the processor is further configured to output the configuration signal so that the voltage selector is activated or deactivated according to an item selected from the plurality of selectable items.

8. The display apparatus of claim 7, wherein the items comprise a single voltage item and a dual voltages item, and
   wherein the voltage selector is activated when a configuration signal corresponding to the single voltage item is output from the processor, and the voltage selector is deactivated when a configuration signal corresponding to the dual voltages item is output from the processor.

9. A power supply comprising:
   a voltage supplier configured to receive input voltage and supply the input voltage as operation voltage for a display apparatus;
   a voltage selector configured to selectively prevent generation of the operation voltage from the voltage supplier according to a level of the input voltage when activated; and
   an activator configured to activate or deactivate the voltage selector based on a configuration signal received from an external source,
   wherein the activator is further configured to:
   deactivate the voltage selector in response to the configuration signal having a first level such that the voltage supplier supplies the operation voltage regardless of the level of the input voltage, and
   activate the voltage selector in response to the configuration signal having a second level such that the voltage supplier supplies the operation voltage if the level of the input voltage is lower than or equal to a level of a reference voltage and the voltage supplier does not supply the operation voltage if the level of the input voltage is higher than the level of a reference voltage.

10. The power supply of claim 9, wherein the voltage selector comprises:
    a comparator configured to receive the input voltage and the reference voltage and to output a comparison result; and
    a transistor configured to be turned on or off according to the comparison result output from the comparator so that the generation of the operation voltage is selectively prevented.

11. The power supply of claim 10, wherein the comparator is further configured to output a signal to turn off the transistor to shut off supply of the operation voltage when the level of the input voltage is higher than the level of the reference voltage.

12. The power supply of claim 9, wherein a wakeup signal is received in response to receiving a user input while the display apparatus is in a standby mode, and
    wherein the power supply further comprises a voltage connector configured to receive the wakeup signal.

13. The power supply of claim 12, wherein the voltage connector comprises a first photo coupler configured to apply the wakeup signal to a light emitter and connect the voltage supplier to a light receiver.

14. The power supply of claim 9, wherein the activator comprises a second photo coupler configured to apply the configuration signal to a light emitter and connect the voltage selector to a light receiver.

15. A power control method of a display apparatus, the method comprising:
- detecting a wakeup signal in a standby mode of the display apparatus;
- determining whether to activate a voltage selector configured to selectively prevent generation of operation voltage from a power supply for the display apparatus to display a image when activated, based on a configuration signal which is generated based on a user input; and
- selectively switching from the standby mode to a normal mode based on a level of an input voltage to the display apparatus in response to the voltage selector being activated,
- wherein the determining whether to activate the voltage selector comprises:
- deactivating the voltage selector in response the configuration signal having a first level such that the power supply supplies the operation voltage regardless of the level of the input voltage, and
- activating the voltage selector in response to the configuration signal having a second level such that the power supply supplies the operation voltage if the level of the input voltage is lower than or equal to a predetermined reference voltage and the power supply does not supply the operation voltage if the level of the input voltage is higher than the predetermined reference voltage.

16. The method of claim 15, further comprising generating the wakeup signal in response to a user input received in the standby mode of the display apparatus.

17. The method of claim 15, further comprising:
- displaying a user interface comprising a plurality of selectable items; and
- selecting an item from among the plurality of selectable items based on the user input,
- wherein the configuration signal is generated based on the selected item.

18. The method of claim 17, wherein the items comprise a single voltage item and a dual voltages item, and
- wherein the voltage selector is activated when the single voltage item is selected, and the voltage selector is deactivated when the dual voltages item is selected.

19. The method of claim 15, further comprising selectively switching the display apparatus from the standby mode to the normal mode based on a comparison between the input voltage and the predetermined reference voltage.

20. The method of claim 19, wherein the selectively switching comprises maintaining the standby mode when the input voltage is higher than the predetermined reference voltage.

* * * * *